Jan. 7, 1964

J. C. AYDELOTT 3,116,700

LOCOMOTIVE

Filed April 26, 1961

INVENTOR.
JOHN C. AYDELOTT

BY *Robert H. Montgomery*

ATTORNEY

Jan. 7, 1964   J. C. AYDELOTT   3,116,700
LOCOMOTIVE

Filed April 26, 1961   3 Sheets-Sheet 2

INVENTOR.
JOHN C. AYDELOTT
BY Robert H Montgomery
ATTORNEY

Jan. 7, 1964   J. C. AYDELOTT   3,116,700
LOCOMOTIVE
Filed April 26, 1961   3 Sheets-Sheet 3

INVENTOR.
JOHN C. AYDELOTT
BY
Robert H Montgomery
ATTORNEY

United States Patent Office 3,116,700
Patented Jan. 7, 1964

3,116,700
LOCOMOTIVE
John C. Aydelott, Erie, Pa., assignor to General Electric Company, a corporation of New York
Filed Apr. 26, 1961, Ser. No. 105,616
21 Claims. (Cl. 105—59)

This invention relates to locomotives, and more particularly to a self-powered electric locomotive air system.

The diesel-electric locomotive is essentially a moveable power-generating station, as well as being a power-consuming device. As such it requires air for diesel engine combustion purposes, ventilation of traction motors and the diesel engine traction generators, radiator cooling and air flow over dynamic braking resistors.

Being moveable, a locomotive is subjected to various and diverse atmospheric and climatic conditions and must take its required air from its immediate surroundings, and a locomotive is often subjected to dirty ambient air. It has been estimated that dirt may be responsible for as much as a quarter of the cost of maintaining diesel-electric locomotives in service. This dirt may be of various composition. For example, abrasive grit may be picked up from the tracks by the slip stream of the locomotive at operating speed affecting especially the rear units in a multiple unit consist, brakeshoe dust is both abrasive and electrically conductive, and any road locomotive will at least pass through industrial areas where the air will contain products of industrial processes. Furthermore, the locomotive itself generates substantial air-contaminating dirt in the form of carbon dust and oil vapors.

Any air utilized for ventilation of electric traction machinery should be clean in order to avoid deposit of dirt and dust on insulation which may cause eventual ground, shorts and/or flash-overs, and increased heating due to build-up on heat-dissipating surfaces. Additionally, oil vapors and exhaust fumes from the diesel engine may cause deposit of oil on traction generator insulation which not only attacks the insulation but provides electrical creepage paths thereon. To avoid the last-mentioned problem, locomotives have been constructed with the diesel engine and the air intake side of the driven generator physically separated by partition or otherwise to avoid accumulation of oily dirt on generator insulation.

It is highly important that engine combustion air be free from dirt to avoid abrasive action on engine parts such as cylinder liners, connecting rod and main bearings, piston rings, gearing, oil pumps, cams, push rods, etc. Also, diesel engines customarily utilize a crankcase exhauster to create a partial vacuum in the crankcase and purge it of oil vapor. Dirt in the engine compartment may be drawn in through any opening or crack in the crankcase and settle in the engine lube oil and cause undue abrasive wear of engine parts.

To supply clean air for use on diesel locomotives, it has been the usual practice to provide car body air filters in the walls of engine room housing. However, these air filters require frequent cleaning or replacement, and where traction machinery blower equipment is so arranged that it draws ventilating air from the engine compartment in competition with the engine, combustion air demands, pressure therein may be lowered and dirt and dust may be drawn in at every crack and opening in the engine compartment. Pressurization of the engine compartment has been suggested to exclude entrance of dirt and dust therein. However, such pressurization requires air from another source as well as additional air cleaning elements.

Many piecemeal attempts have been made to improve the ventilation system of diesel-electric locomotives; however, the known attempts, such as the aforementioned partitioning or separation of the traction generator from the diesel engine have attached particular problem areas and not viewed locomotive air requirements as a whole.

It is therefore an object of this invention to provide a locomotive structure wherein all air requirements of a locomotive are satisfied from a central air system. Further among the objects of this invention are the provision of an improved locomotive air system for providing clean air for ventilating traction equipment, engine combustion purposes and pressurization of locomotive equipment compartments; provision of ventilating air to be subsequently used for locomotive compartment pressurization; provision of a central locomotive air intake source for satisfying all air requirements of a locomotive and provision of a simply arranged locomotive of compact design which eliminates blower motors.

The novel features of the invention are set forth with particularity in the claims appended to and forming part of this specification. However, the invention itself, both as to its organization and operation, together with further objects and advantages thereof, may best be understood by reference to the following description and illustration of a locomotive embodying the invention wherein:

Figure 1:
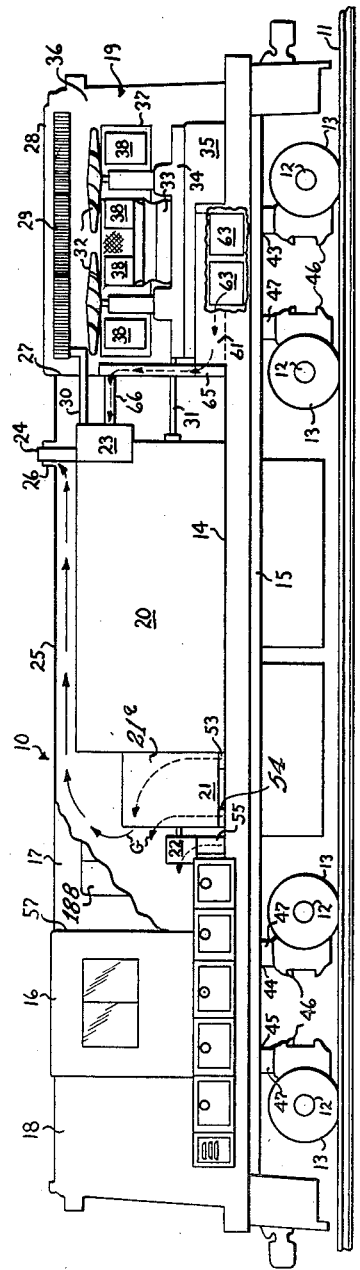
FIGURE 1 is an elevation view of a locomotive embodying the invention, wherein portions of the walls of the locomotive hood are cut away.

Referring now to the drawings wherein the same numerals are used throughout the several illustrations to identify same elements, FIG. 1 illustrates diesel-electric locomotive 10 of the so-called road switcher type. The locomotive 10 is supported and adapted to move on rails 11 by means of axles 12 and wheels 13 which carry a truck assembly, not shown. The truck assembly in turn supports a locomotive platform 14 having as its main support a longitudinal main structural member 15 extending substantially the length of the locomotive. The structural member in fact provides the equipment platform. Centrally located along the longitudinal axis of the platform 14 are an operator's cab or compartment 16, a power-generating equipment compartment 17, a utility compartment 18, which may house a steam-generating unit, sand, or other necessary equipment. Adjacent the generating equipment compartment at the opposite end thereof from the operator's cab 16 is an air system intake compartment 19.

The generating equipment compartment 17 encloses a diesel engine 20 directly driving a main or tractive power generator 21 by connection to the engine drive shaft, not shown. The diesel engine further drives a tractive power generator-exciter generator 22 and a battery-charging generator, not shown, mounted adjacent exciter generator 22. The diesel engine 20 includes a supercharger 23, preferably of the turbine type, and has an exhaust stack 24 extending therefrom through the roof 25 of equipment compartment 17. The roof 25 defines an equipment compartment vent 26 about engine exhaust stack 24 for a purpose hereinafter explained. The air system intake compartment 19 is physically separated from equipment compartment 17 by means of a bulkhead or partition 27 therebetween. The roof 28 of air intake compartment 19 has open hatches, not shown, therein to allow passage of radiator cooling air therethrough.

The hatches are covered with wire mesh material to protect the radiators. Mounted adjacent the roof 28 of compartment 19 are radiators 29 which communicate with an engine coolant conduit 30. Other coolant conduits for circulating engine coolant through the engine coolant jackets, cooling control means and radiators 29 and return, not shown, also form part of the engine cooling system. A preferred engine cooling and radiator system is disclosed and claimed in the copending application of William W. Peters and John C. Aydelott, Serial No. 861,537, filed December 23, 1959, now U.S. Patent No. 3,067,817, and assigned to the same assignee as the present invention.

An extension 31 of the engine drive shaft extends through partition 27 to drive through gearing arrangements, not shown, radiator fans 32 and air intake blower 33. The radiator fans 32, blower 33, and the gearing for driving them may be supported on pedestals and cross members, not shown. The gearing mechanism which may be of any suitable form, is enclosed within a housing or shroud 34 which defines a space above air cleaner 35, as hereinafter described. Defined in either side wall 36 of compartment 19 are openings 37 to allow the admission of air into compartment 19. The openings 37 may be covered with a wire mesh. Where the locomotive is to be equipped with facility for dynamic braking, dynamic braking resistors 38 are mounted in the openings 37.

Figure 2:
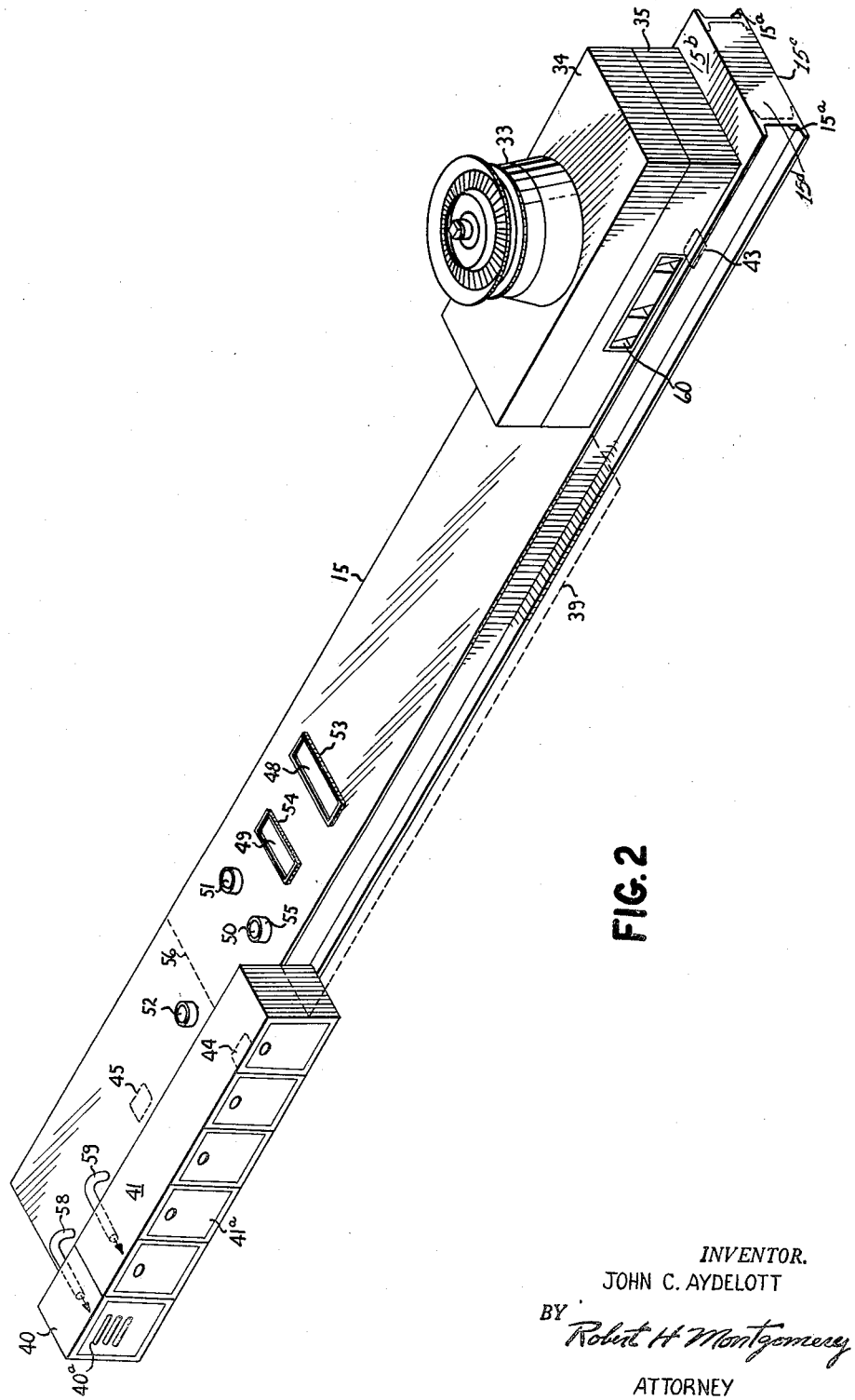
FIGURE 2 illustrates a portion of the locomotive air cleaning system and traction equipment ventilating system.

Reference is now made to FIG. 2, in conjunction with FIG. 1, which illustrates the main longitudinal structural member 15 of the locomotive, air intake blower 33, casing 34 and air cleaner 35. The structural member 15, which provides the main locomotive platform, also provides a main ventilating duct for tractive equipment ventilating air. The center sill 15 is completely closed and is illustrated as formed of parallel I-beams 15a which are closed at the top, bottom and ends by means of plates 15b, 15c and 15d respectively. The upper flanges of the I-beams provide locomotive equipment support surfaces. The I-beams are appropriately internally braced and spaced by cross members. The plates 15b, 15c and 15d cooperate with the I-beams 15a to define a longitudinal air duct. The cross-sectional area of the center sill is selected in accordance with the size of the locomotive and the volume of air that has to be passed therethrough for ventilating traction equipment. By way of example only, a 2500 H.P., 125-ton locomotive constructed in accordance with the invention has a member 15 measuring approximately 21 inches deep by 5 feet wide at the centers of beams 15a. The plate member 15b may extend on either side of the I-beams 15a to provide a walk-way along compartment 17, as indicated by the dashed line 39 along the side of the locomotive. Also illustrated in FIG. 2 are equipment control compartments 40 and 41 having doors 41a therein. For reasons hereinafter explained, the doors 41a are provided with sealing material thereabout which makes the doors to the control equipment compartment 41 substantially airtight.

Contained within the equipment compartment 41 is the various electrical equipment such as resistors, relays, contactors, reverser, etc., which form generator excitation and traction generator transition control circuitry, and appropriate electrical connections are made to these circuit elements through electrical wiring and bus bars, not shown. Contained within equipment compartment 40 are various generator excitation circuit resistors. Compartment 40 also has louvers 40a therein for reasons hereinafter explained.

A portion of plate 15b is omitted to provide an opening into member 15 beneath air cleaner 35 whereby the clean air output side of air cleaner 35 communicates with the interior of member 15. Openings 43, 44 and 45 are illustrated in member 15c to provide communication between the interior of member 15 and traction motors 46 mounted on axles 12 and drivingly connected thereto. As it is well known to one skilled in the art, the traction motors are further suspended from longitudinal truck members, not shown. The openings 43, 44, and 45 communicate with the traction motor through flexible conduits 47, FIG. 1. The conduits 47 which are well known to those skilled in the art, take the appearance of corrugated rubber-like material. Apertures 48, 49, 50, 51 and 52 are further defined in plate member 15b and provide communication between the interior of center sill 15 and various locomotive equipment to be ventilated. Aperture 48 through duct 53 provides a path of air flow into the drive end 21a of tractive power generator 21, and aperture 49 together with duct 54, provides air flow over the commutator of tractive power generator 21. Aperture 50, together with duct 55, provides a passage for air flow through exciter generator 22 and aperture 51 through a similar duct provides for air flow through a battery-charging generator, not shown. Ventilating air forced through the generators is exhausted into compartment 17, as indicated by the dashed arrows G. Aperture 52 provides communication between the interior of center sill 15 and the operator's cab 16, which may lead to a cab heater. Variable louvers, not shown, may be provided to control air flow into the cab 16. In FIG. 2, the dashed line 56 represents partition 57, FIG. 1, separating the operator's cab 16 from the generating equipment compartment 17. Conduits 58 and 59 provide communication between the interior of center sill 15 and the control equipment compartments 40 and 41.

Figure 3:
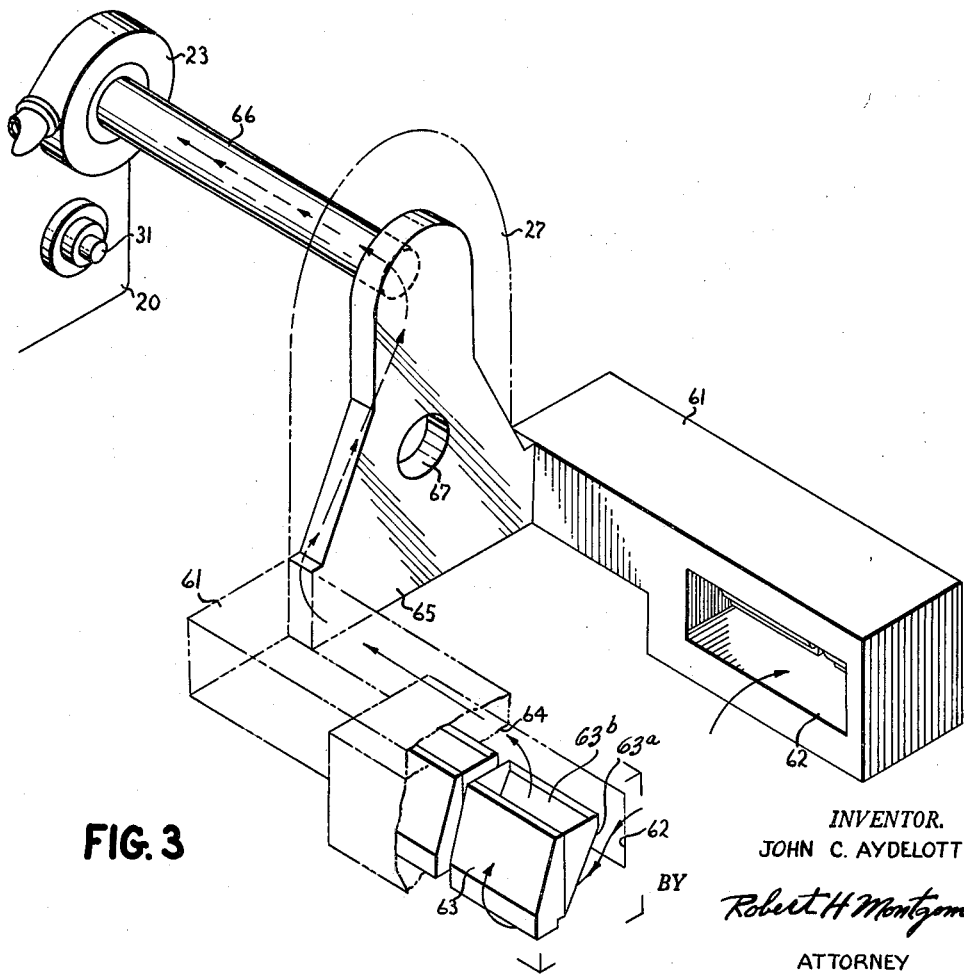
FIGURE 3 illustrates the engine combustion air supply system.

The air system further includes means, shown in detail in FIG. 3, for supplying filtered combustion air to the engine 20. To this end, a pair of combustion air conduits 61 are provided. Conduits 61 are mounted, as shown generally in FIG. 1, on either side 36 of air intake compartment 19. Although not shown in detail in FIG. 3, a suitable duct means is provided which connects the openings 62 in combustion air conduits 61 with the openings 60 (FIG. 2) on either side of air cleaner 35.

Associated with conduits 61 are air filters 63 which further clean the air received from air cleaner 35 prior to application to the engine 20. The filters are housed in a filter housing 64 within the combustion air conduits 61. Each conduit 61 communicates with an air duct 65 which in turn is connected to air duct 66, which leads to the engine supercharger 23. An aperture 67 is defined in duct 65 to permit engine drive shaft 31 to pass therethrough and drive radiator fans 32 and air intake blower 33. The filtering elements 63 are preferably of the oil bath impingement type, wherein air entrains oil prior to impingement and oil serves to wash dirt from filter element back into sump. However, other type air filters may be used. In the illustrated example, baffles 63a cooperate with filters 63 to direct air under the filter and further provide an exit aperture 63b therewith communicating with conduit 61. Air flow into openings 62, through the filters 63 and to the supercharger is indicated by the arrows.

Figure 4:
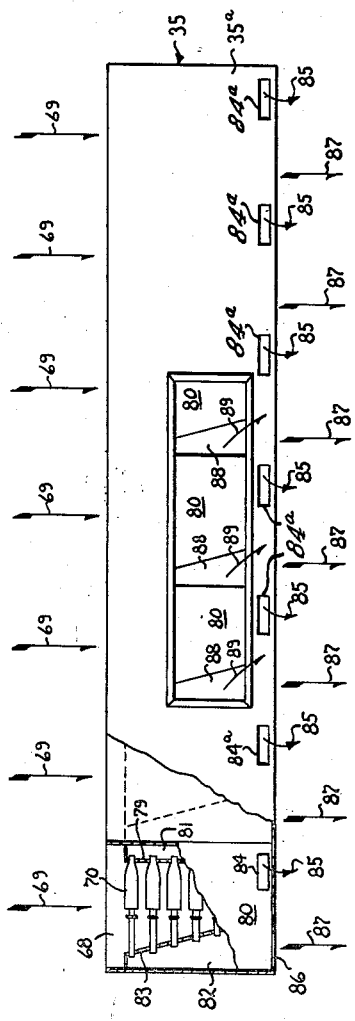
FIGURE 4 illustrates a preferred air cleaner.
Figure 5:
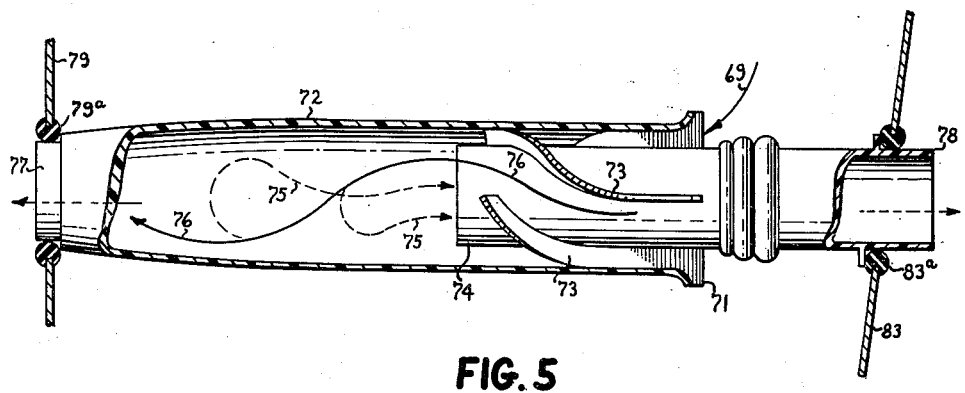
FIGURE 5 illustrates a preferred air cleaning element.

Reference is now made to FIG. 4, which illustrates the air cleaner 35. The air cleaner 35 contains a plurality of compartments 68 into which air represented by arrows 69 is forced from the blower 33 through casing 34. Each compartment 68 contains air cleaning elements 70 which operate on the vortex principle to remove dirt and dust from air blown into the compartments 68. With reference to FIG. 5, air, indicated by the arrow 69, enters opening 71 of tube 72. The air is forced in from the blower 33 through opening 71 and spun by guide vanes 73, a vortex is formed as the air whirls through the tube. Cleaned air will enter tube 74, as indicated by arrows 75, while dirt and dust ladened air, as represented by the arrows 76 will discharge from the nozzle 77 of tube 72. The principle of operation of a vortex air cleaner element 70 is explained in Patent 2,424,122 of F. B. Schneider, assigned to the same assignee as the present invention.

The clean air 75 will exit from end 78 of tube 74. The nozzles 77 of tube 72 is supported in a dirt-collecting chamber defining plate 79 by a grommet 79a, which, together with side walls 80, define chamber 81. The ends 78 of tube 74 communicate with a clean air chamber 82 which is partially defined by plate 83 which supports the ends 78 of tube 74 in grommet 83a. Apertures 84 are further provided in walls 80 and mating apertures 84a are provided in side wall 35a in the housing of air cleaner 35 to allow discharge of dirt therefrom. Discharge of dirty air from apertures 84 is represented by the arrows 85, FIG. 4. The dirt-ladened air may be ducted through the platform 14 to discharge beneath the locomotive, or in a simplified alternative, adjacent apertures may be provided in the platform 14 to allow discharge of the dirt-ladened air therefrom. The chambers 82 into which clean air is discharged from tube 74 openly communicate at the bottom openings 86 thereof with the interior of member 15. Air, represented by arrows 87, is forced through openings 86 into the main air duct defined by member 15. The clean air chambers 82 adjacent opening 60 have apertures 88 provided in their side walls 80 to allow cleaned air, as represented by the arrows 89, to be forced into openings 62 in engine air conduit 61, and hence through filters 63 to supercharger 23 along the path previously described.

When the locomotive diesel engine 20 is operating, the system functions as follows: The engine shaft 31 drives radiator fans 32 proportional to engine speed, which draws ambient air into compartment 19 through intake openings 37 and blows the air thus drawn in through radiators 29 and out through the roof 28 of compartment 19. Air flow through the openings 37 will flow over and through the dynamic braking resistors 38 to carry off heat generated therein to cool the resistors 38. Air taken in by the blower 33 first passes through the air cleaner 35 and the major portion thereof is forced into the hollow member 15 which defines the main air duct for ventilation of tractive equipment. The capacity of the blower 33 is chosen such that the air forced into the center sill 15 is at a high pressure. A portion of this air then is forced through conduit 58 into compartment 40 to flow over the control resistors therein and exits through louvers 40a. Air is also forced through conduit 59 into control equipment compartment 41 to create therein a pressurized condition which will exclude the entrance of dirt and dust into the control compartments 40. Air is further forced through apertures 48 and 49 in top plate 15b and through ducts 53 and 54 to tractive power generator 21, and also through apertures 50 and 51 via communicating ducts into and through the exciter generator 22 and the battery-charging generator, not shown, to provide ventilation thereof. The air flow through the generators is indicated by the dashed arrows G superimposed thereon in FIG. 1. The equipment generating compartment 17 is provided with imperforate access doors 188 on the sides thereof. These doors are designed to have a close fit in the side walls of compartment 17. Therefore, as the generator ventilating air exits from the compartment 17, the pressure within compartment 17 is raised above the ambient air pressure and prevents admittance of dirt, dust and other contaminating matter. The air which pressurizes the compartment 17 may exit therefrom through the vent 26 in the roof 25 of generating equipment compartment 17 which surrounds the exhaust stack 24. Inasmuch as the hotter air in compartment 17 tends to rise, there will be a constant circulation of air in compartment 17. The vented air from compartment 17 in rising concentrically about engine exhaust stack 24 will prevent the engine exhaust gases from returning within the compartment 17.

It will be noted that in the locomotive structure provided there is no equipment over the diesel engine which would prevent removal of the engine from the platform 14. For further simplicity of construction and ease of maintenance, the walls defining the generating equipment compartment 17 are flanged to the bottom and bolted to the platform 14 so they may be easily removed.

The provision of the air cleaner 35 communicating with the air duct formed by the member 15 and support of blower 33 thereon allows the engine drive shaft to drive the blower. This arrangement eliminates overhead blowers in the locomotive roof and blower motors and wiring and controls therefor to provide a simpler, easier to maintain locomotive.

The dynamic braking resistors 38 are preferably so mounted that space is provided between the bottom thereof and the bottom of the intake openings 37. During dynamic braking the traction motors are disconnected from the generators and driven by the axles the motors are mounted on. The traction motor fields are connected across the generator 21 and the motors operate as generators supplying energy to the resistors 38 which is dissipated in the form of heat. The traction motors thus loaded act as generators and exert a retarding torque on the driving axles.

In one locomotive embodying the invention, the fans 32 move approximately 100,000 cubic feet of air per minute over the radiators, while the blower 33 forces 30,000 cubic feet of air per minute into the cleaner 35 when the engine 20 is operated at rated speed. The heated air passing through the resistors during dynamic braking is drawn upwardly by the fans 32 while the cooler air is drawn through the blower 33. Due to the heating of the resistors 38, the air entering compartment 19 will be in substantially laminar flow and the resistor 38 cooling air will not unduly affect traction equipment ventilating air. Also, during dynamic braking the engine 20 will be operated at rated speed but light load, since it must only supply exciting energy to the motors. Thus there will be no demand for cool air flow over radiators 29.

A further advantage of this invention is that the fans 32 and blower 33 are driven at a speed proportional to engine speed and hence the load on the engine; thus the quantity of air required and supplied is self-regulated, and all locomotive air requirements are satisfied from a single source. The generating equipment compartment is physically isolated from other locomotive compartments and is pressurized in a very simple manner. Furthermore, the structure disclosed provides for pressurization of the electrical control equipment compartments 40. It will further be sent that the engine combustion air filters are mounted towards the outside of the locomotive and by provision of access doors in the outboard sides of conduit 61, facilitates removal of the filtering element 63 for cleaning and/or replacement. However, inasmuch as engine combustion air is supplied under pressure as it enters the filter 63, part of this pressure reaches through to the supercharger 23 and thus improves engine operating conditions. Because of the fact that the centrifugal type of primary air cleaner 35 which is used is so efficient, the engine air filters 63 in the combustion air stream will accumulate dirt so slowly that they will require very little servicing.

While a preferred embodiment of the invention and preferred elements used therein have been selected for purposes of disclosure, other embodiments and modifications of the disclosed invention may occur to those skilled in the art which do not depart from the spirit and scope of the invention. Accordingly, it is intended to cover all modifications of the invention and changes in the illustrations chosen for purposes of disclosure which do not constitute departures from the spirit and scope of the invention.

What I claim as new and desire to secure by Letters Patent of the United States is:

1. A locomotive comprising an internal combustion engine prime mover and electric traction equipment, a hollow structural member extending substantially the length of said locomotive to provide a locomotive platform and support therefor and further defining an air duct, an air intake compartment having end walls, side walls, and a perforate roof on said platform, an engine cooling system radiator mounted adjacent said roof, a radiator fan positioned adjacent said radiator, an air cleaner mounted on said structural member, an air intake blower positioned above said air cleaner and arranged to force air through said air cleaner into said structural member, a shaft driven by said engine extending through one of said end walls and arranged to drive said fan and said blower, air intake openings defined in said side walls to allow entrance of air into said compartment, duct means providing communication between the interior of said structural member and said traction equipment whereby upon operation of said engine said fan draws air through said intake openings and forces it over said radiator surfaces through said roof and said blower draws air through said intake openings and forces it through said air cleaner into said structural member to said traction equipment.

2. The locomotive of claim 1 wherein duct means communicate with clean air outlets of said air cleaner to supply combustion air to said engine.

3. The locomotive of claim 2 wherein said duct means contain additional air cleaning means for further cleaning engine combustion air.

4. The locomotive of claim 1 including a compartment thereon housing electrical control elements for said traction equipment and air ducts providing communication between the interior of said structural member and the interior of said compartment to increase the air pressure in said compartment above the ambient pressure to thereby prevent entrance of dirt into said compartment.

5. The locomotive of claim 1 wherein said engine and tractive power-generating equipment are housed in a second compartment on said platform and ventilating air supplied said generating equipment exits from said generating equipment within said second compartment and increases the pressure therein above ambient air pressure.

6. The locomotive of claim 1 wherein dynamic braking resistors are supported in the path of air drawn into said air intake openings in said air intake compartment.

7. A locomotive comprising a platform, wall means defining a power-generating compartment on said platform, a diesel engine prime mover driving a tractive power generator in said compartment, a hollow structural member extending substantially the length of said locomotive providing said platform and further defining an air duct, wall means defining an air intake compartment on said platform adjacent said power-generating compartment, an air cleaner having an air input opening and an air outlet opening mounted on said platform within said air intake compartment with said air outlet communicating with the interior of said structural member, air intake openings, defined in said air intake compartment, a blower mounted on the air cleaner inlet opening and driven by said engine and adapted to draw air into said compartment through said intake openings and force the air through said air cleaner into said structural member, and duct means providing communication between said structural member and said generator to allow passage of air into said generator.

8. The locomotive of claim 7 further provided with traction motors and duct means providing communication between said structural member and said motors to allow passage of air into said motors.

9. The locomotive of claim 7 including an operator's cab and duct means providing communication between said structural member and said cab to allow ventilating air flow into said cab.

10. The locomotive of claim 7 wherein duct means communicate with clean air outlets of said air cleaner to supply combustion air to said engine.

11. The locomotive of claim 10 wherein said duct means contain additional air cleaning means for further cleaning engine combustion air.

12. The locomotive of claim 7 including a compartment thereon housing electrical control elements for said traction equipment and air ducts providing communication between the interior of said structural member and the interior of said compartment to increase the air pressure in said compartment above the ambient pressure to thereby prevent entrance of dirt into said compartment.

13. The locomotive of claim 7 wherein said engine and tractive power-generating equipment are housed in a second compartment on said platform and ventilating air supplied said generating equipment exits from said generating equipment within said second compartment and increases the pressure therein above ambient air pressure.

14. The locomotive of claim 7 wherein dynamic braking resistors are supported in the path of air drawn into said air intake openings in said air intake compartment.

15. A locomotive comprising a prime mover mounted on a platform, an air intake compartment having side walls, a perforate roof, and end walls, air intake openings defined in said side walls, prime mover cooling system radiators mounted adjacent said roof, a fan mounted adjacent said radiators adapted to blow air therethrough, an air cleaner mounted on said platform having a clean air outlet communicating with a main air duct, said cleaner having an air inlet, a blower mounted on said air cleaner adapted to force air therethrough into said main air duct, a shaft driveable by said prime mover extending through one of said end walls and driveably connected to said fan and said blower whereby said fan and blower are driven at speeds proportional to engine speed.

16. A locomotive comprising: a platform member; first wall means defining a substantially closed compartment on said platform member; a prime mover comprising an internal combustion engine mounted on said platform within said first compartment; an electric power generator in said compartment driven by said engine and arranged to supply electric power to locomotive traction motors; second wall means defining an air intake compartment adjacent said first compartment, a partition separating said compartments; means for drawing air from without said locomotive into said air intake compartment, cleaning the air, and forcing the air through said generator into said first compartment to ventilate said generator and to raise the air pressure in said compartment above the pressure of said ambient to the locomotive to thereby prevent air ambient to said locomotive from entering said first compartment.

17. The locomotive of claim 16 wherein engine combustion air is drawn from without said locomotive into said air intake compartment and ducted through said partition to said internal combustion engine.

18. A locomotive comprising: a platform member; first wall means defining a substantially closed compartment on said platform member; a prime mover comprising an internal combustion engine mounted on said platform within said first compartment; an electric power generator driven by said engine and arranged to supply electric power to locomotive traction motors; second wall means defining an air intake compartment adjacent said first compartment, a partition separating said compartments; means for drawing air from without said locomotive into said air intake compartment, cleaning the air, and forcing the air through said generator into said first compartment to ventilate said generator and to raise the air pressure in said first compartment above the pressure of air ambient to the locomotive to thereby prevent air ambient to said locomotive from entering said first compartment; and further means for supplying cleaned air from said air intake compartment to said engine for combustion purposes.

19. The locomotive of claim 18 including duct means extending longitudinally of said locomotive and adapted to convey ventilating air to said traction motors, said duct means communicating with said means for drawing air.

20. A locomotive comprising: a platform member; first wall means defining a substantially closed compartment on said platform member; a prime mover comprising an internal combustion engine mounted on said platform within said first compartment and having an exhaust stock extending through an aperture in said compartment; an electric power generator driven by said engine and arranged to supply electric power to locomotive traction motors; second wall means defining an air intake compartment adjacent said first compartment, a partition separating said compartments; means for drawing air from without said locomotive into said air intake compartment, cleaning the air, and forcing the air through said generator into said first compartment to ventilate said generator and to raise the air pressure in said first compartment above the pressure of air ambient to the locomotive to thereby prevent air ambient to said locomotive from entering said first compartment, the air pressurizing said first compartment being allowed to exhaust through said aperture about said exhaust stack.

21. A locomotive comprising: a platform member; first wall means defining a substantially closed compartment on said platform member; a prime mover comprising an internal combustion engine mounted on said platform within said first compartment; an electric power generator driven by said engine and arranged to supply electric power to locomotive traction motors; second wall means defining an air intake compartment adjacent said first compartment, a partition separating said compartments; means for drawing air from without said locomotive into said air intake compartment, cleaning the air, and forcing the air through said generator into said first compartment to ventilate said generator and to raise the air pressure in said first compartment above the pressure of air ambient to the locomotive to thereby prevent air ambient to said locomotive from entering said first compartment; electrical control means and normally closed compartment means housing said electrical control means, duct means providing communication between said first compartment and said compartment means to pressurize said compartment means.

References Cited in the file of this patent

UNITED STATES PATENTS

| | | | |
|---|---|---|---|
| 1,780,517 | Christianson | Nov. 4, | 1930 |
| 1,791,139 | Masury et al. | Feb. 3, | 1931 |
| 1,813,218 | Whittaker | July 7, | 1931 |
| 1,833,094 | Sheehan | Nov. 24, | 1931 |
| 1,835,673 | Sheehan | Dec. 8, | 1931 |
| 1,847,609 | Harnett | Mar. 1, | 1932 |
| 2,009,823 | Van Vulpen et al. | July 30, | 1935 |
| 2,076,231 | Glaenzer et al. | Apr. 6, | 1937 |
| 2,076,399 | Carson | Apr. 6, | 1937 |
| 2,230,580 | Adams et al. | Feb. 4, | 1941 |
| 2,253,676 | Baade | Aug. 26, | 1941 |
| 2,299,421 | Essl | Oct. 20, | 1942 |
| 2,666,497 | Weber | Jan. 19, | 1954 |

UNITED STATES PATENT OFFICE
CERTIFICATE OF CORRECTION

Patent No. 3,116,700

January 7, 1964

John C. Aydelott

It is hereby certified that error appears in the above numbered patent requiring correction and that the said Letters Patent should read as corrected below.

Column 8, line 48, after "said" insert -- first --; line 49, for "said" read -- air --; column 9, line 10, for "stock" read -- stack --.

Signed and sealed this 26th day of May 1964.

(SEAL)
Attest:

ERNEST W. SWIDER
Attesting Officer

EDWARD J. BRENNER
Commissioner of Patents